(12) United States Patent
Velten et al.

(10) Patent No.: US 12,243,195 B2
(45) Date of Patent: Mar. 4, 2025

(54) LOW-LIGHT VIDEO SYSTEM

(71) Applicants: Wisconsin Alumni Research Foundation, Madison, WI (US); OnLume Inc., Madison, WI (US)

(72) Inventors: Andreas Velten, Madison, WI (US); Trevor Seets, Madison, WI (US); Wei Lin, Madison, WI (US); Christie Lin, Madison, WI (US); Adam Uselmann, Madison, WI (US); Yizou Lu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 344 days.

(21) Appl. No.: 17/661,338

(22) Filed: Apr. 29, 2022

(65) Prior Publication Data
US 2023/0351551 A1 Nov. 2, 2023

(51) Int. Cl.
*G06T 5/00* (2024.01)
*G06T 5/50* (2006.01)
*G06T 5/70* (2024.01)
*G06T 7/20* (2017.01)

(52) U.S. Cl.
CPC ............... *G06T 5/70* (2024.01); *G06T 5/50* (2013.01); *G06T 7/20* (2013.01); *G06T 2207/10064* (2013.01); *G06T 2207/20081* (2013.01); *G06T 2207/20084* (2013.01); *G06T 2207/20212* (2013.01); *G06T 2207/30024* (2013.01)

(58) Field of Classification Search
CPC .... G06T 5/70; G06T 5/50; G06T 7/20; G06T 2207/10064; G06T 2207/20081; G06T 2207/20084; G06T 2207/20212; G06T 2207/30024
See application file for complete search history.

(56) References Cited

U.S. PATENT DOCUMENTS

| 2015/0025391 A1* | 1/2015 | Mackie ............... A61B 1/0655 600/476 |
| 2017/0176336 A1* | 6/2017 | Dimitriadis .......... A61B 5/0071 |
| 2017/0354392 A1* | 12/2017 | Fengler ............... A61B 1/0684 |

FOREIGN PATENT DOCUMENTS

CN 112258560 A 1/2021

OTHER PUBLICATIONS

Yu-Wing Tai et al. "Image/video deblurring using a hybrid camera." In 2008 IEEE Conference on Computer Vision and Pattern Recognition, pp. 1-8. IEEE, 2008.
Samuel W. Hasinoff et al.;"Burst photography for high dynamic range and low-light imaging on mobile cameras." ACM Transactions on Graphics (ToG) vol. 35, No. 6; Article 192; pp. 1-12 (2016).
Moshe Ben-Ezra et al.; "Motion-based motion deblurring." IEEE transactions on pattern analysis and machine Intelligence vol. 26, No. 6; pp. 689-698 (2004).
(Continued)

*Primary Examiner* — Khai M Nguyen
(74) *Attorney, Agent, or Firm* — Boyle Fredrickson, S.C.

(57) ABSTRACT

Real time, low-light images, for example, obtained from the fluorescent marker for identifying tumors during surgery, are combined to improve the signal-to-noise ratio using a motion signal derived from corresponding high-light images, for example, taken with a second camera at interleaved intervals of higher illumination.

21 Claims, 4 Drawing Sheets

(56) References Cited

OTHER PUBLICATIONS

Haonon Su et al.; "Multi-Spectral Fusion and Denoising of Color and Near-Infrared Images Using Multi-Scale Wavelet Analysis." Sensors 2021, No. 11; 3610; pp. 1-24 (2021).
Orly Liba et al.;"Handheld mobile photography in very low light." ACM Transactions on Graphics (TOG) vol. 38, No. 6; Article 164; pp. 1-22 (2019).
Feixia Yang et al.; "Multi-sensor data fusion of remotely-sensed images with sparse and logarithmic low-rank regularization for shadow removal and denoising." International Journal of Remote Sensing 42, No. 18: pp. 6961-6983; May 2021; UK.
International Search Report for PCT/US2023/018434 dated Aug. 7, 2023.

\* cited by examiner

LOW-LIGHT VIDEO SYSTEM

STATEMENT REGARDING FEDERALLY SPONSORED RESEARCH OR DEVELOPMENT

This invention was made with government support under 1846884 awarded by the National Science Foundation. The government has certain rights in the invention.

CROSS REFERENCE TO RELATED APPLICATION

--

BACKGROUND OF THE INVENTION

The present invention relates to a medical imaging system for detecting faint fluorescence signals and in particular to a fluorescence imaging system usable in brightly lit environments, for example, a surgical suite.

Fluorescent marker compounds that target cancerous tumors hold promise in allowing rapid identification of ex vivo tissue, for example, as obtained from a biopsy. The fluorescence signal developed by such marker compounds is relatively faint and normally viewed with special fluorescent microscopes that selectively illuminate the tissue with a proper exciting waveform and that employ sensitive imaging systems that can isolate and detect the returned fluorescence signal. Multiphoton and confocal microscope optics, for example, may be used to isolate the fluorescence signal from specific tissue while image intensifiers, such as photomultiplier tubes or the like, may be used to amplify the faint signal for detection.

While such fluorescent markers potentially simplify the identification of tumors, the ability of fluorescent markers to guide a surgical procedure is limited by the time required to transport tissue samples to a remote location suitable for fluorescence analysis. Alternatively, the samples are imaged in the operating room, often before extraction from the patient. In this scenario, ambient illumination remains active but is dimmed, and light filters are typically used and this limits the speed, sensitivity, and applicability of the method due to the reduced signal and added background noise. Alternatively the ambient light needs to be switched off periodically during surgery, interrupting the workflow of the entire team.

U.S. Pat. No. 10,045,696 entitled "Tissue Fluorescence Monitor with Ambient Light Rejection" assigned to the assignees of the present invention and hereby incorporated by reference, describes a fluorescence imaging system that operates in coordination with a rapidly switched ambient lighting system, the latter turning the ambient lighting on and off at a speed imperceptible to the human eye. The short periods of darkness during the switching process are exploited to perform fluorescence imaging without significant interference from the ambient light. By making fluorescence imaging compatible with bright illumination, the invention allows the fluorescence imaging equipment to be moved into a surgical suite or used in modified form for in vivo examination of tissue.

In many important applications of fluorescence imaging, the fluorescent images remain faint, having only a few tens of photons per pixel per frame. This can be remedied by aligning and then combining successive frames together, the alignment serving to reduce motion blur while increasing the quality of the image, for example, sharpness, contrast-to-noise ratio, or signal-to-noise ratio. With extremely low-light images, however, accurate alignment is difficult and therefore increased blur occurs.

SUMMARY OF THE INVENTION

The present inventors have recognized that a "high-light" image, for example, available in the switched ambient lighting system described above, co-registered with the low-light image produced by fluorescence monitoring, can then be used as a proxy for determining the motion of the low-light image during the combination of successive low-light images. The result is a higher signal-to-noise ratio with improved alignment and thus reduced motion blur. Combining the high-light and low-light images with a properly trained neural network can provide further reductions in artifacts caused from the low-light acquisition and combination process.

Specifically, in one embodiment, the invention provides a low-light video system having a having at least one camera that can receive low-light from an imaged object to provide a sequence of low-light image frames and high-light from the imaged object having a greater flux than the low-light to provide a sequence of high-light image frames. An electronic processor implements: (a) a motion extractor receiving the high-light image frames from the at least one camera to determine motion of the imaged object between high-light image frames; and (b) an integrator combining low-light image frames after alignment according to the motion determined by the motion extractor to output reduced noise low-light image frames.

It is thus a feature of at least one embodiment of the invention to reduce the inadvertent introduction of errors into low-light images when they are combined to reduce noise resulting from errors in deducing motion for low-light images.

In one embodiment, the invention may further include a neural network receiving the reduced noise low-light image frames and outputting corrected low-light image frames, the neural network trained with a teaching set of pairs of low-light image frames with respectively higher and lower levels of noise with respect to a common imaged object.

It is thus a feature of at least one embodiment of the invention reduce artifacts in the motion correction process by using a neural net trained to "ground truth" low-noise images.

The teaching set of low-light image frames may be images of tissue.

It is thus a feature of at least one embodiment of the invention to provide a system well adapted for use in real-time surgical applications.

In one embodiment, each teaching set of pairs of low-light image frames may include a fluorescence image of tissue and the same fluorescence image of tissue with added simulated noise.

It is thus a feature of at least one embodiment of the invention to provide a simple method of determining a "ground truth" with respect to a fluorescent image. High signal-to-noise ratio fluorescent images may be used for the ground truth and then degraded by the introduction of noise to complete the training set.

The teaching set of low-light image frames may represent images taken with the at least one camera of the tissue, and the teaching set may further include high-light image frames representing images taken with the at least one camera of the tissue.

It is thus a feature of at least one embodiment of the invention to exploit the higher information content of the high-light signal used to deduce motion to also reduce artifacts in the motion correction process and otherwise inform the image reconstruction with respect to a class of imaged objects such as tissue.

The low-light video system may further include an error detector producing an error signal indicating errors in the determined motion relating to at least a portion of a high-light image frame, and the integrator may use the error signal to exclude a portion of a corresponding low-light image frame from the combining.

It is thus a feature of at least one embodiment of the invention to limit artifacts generated by abrupt changes between images, for example, a portion of an image being momentarily occluded by a surgical instrument, which might otherwise be erroneously interpreted as motion.

The error signal maybe produced by warping an early received high-light image frame according to the determined motion with respect to a later received-light image frame and comparing the warped early received high-light image frame to the later received high-light image frame to identify pixels having differences in value of more than a predefined threshold, the determine pixels providing the error signal.

It is thus a feature of at least one embodiment of the invention to provide a simple mechanism for identifying motion detection errors.

The integrator may combine different numbers of low-light image frames for different pixels of the low-light image frames. In one example, the number of low-light image frames may be determined according to a number of low-light image frames occurring after an error signal including the given pixel.

It is thus a feature of at least one embodiment of the invention to provide a simple method of eliminating frames with motion errors without introducing additional artifacts by changing the window over which pixels of different frames are combined.

The low-light video system may further include a synchronization circuit synchronizing the acquisition of the sequence of low-light image frames and the sequence of high-light image frames with an area illuminator switching between an on-state and off-state so that the low-light image frames are obtained only during the on-state and high-light image frames are obtained only during the off-state.

It is thus a feature of at least one embodiment of the invention to make use of surgical systems that provide momentary bright and darkened ambient illumination to obtain the necessary high-light and low-light image frames.

These particular objects and advantages may apply to only some embodiments falling within the claims and thus do not define the scope of the invention.

DETAILED DESCRIPTION OF THE PREFERRED EMBODIMENT

Figure 1:
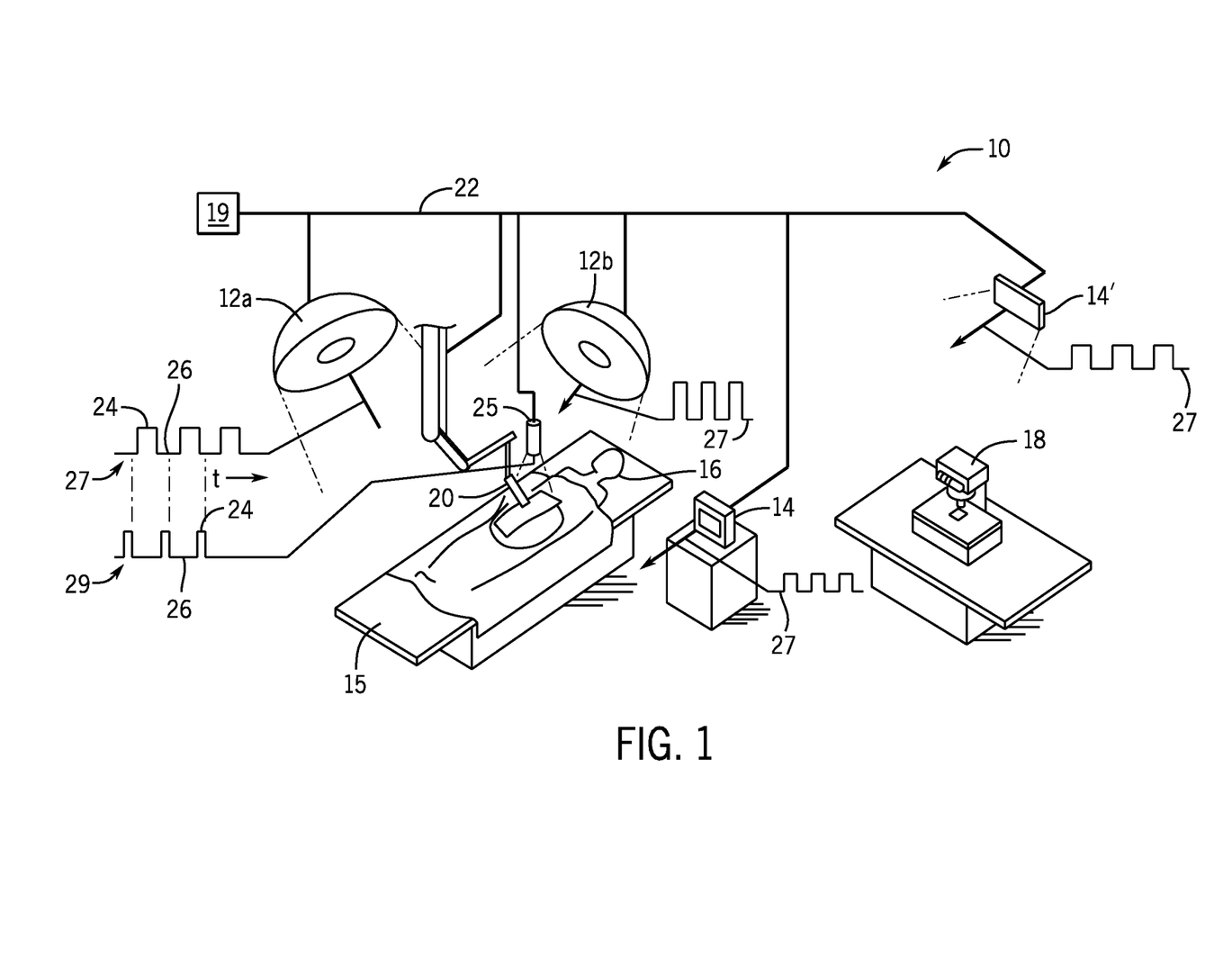
FIG. 1 is a simplified perspective view of a surgical suite suitable for use with the present invention showing area illuminators, display lights, and a surgical and desktop fluorescence imaging system coordinated by a control system.

Referring now to FIG. 1, a surgical suite 10 or the like may provide for multiple area illuminators 12a and 12b, for example, positioned to illuminate an operating room table 15 holding a patient 16 for surgery. In addition, the surgical suite 10 may include multiple display lights 14 and other sources of light including, for example, display lights 14 providing for visual signals, for example, an illuminated sign display light 14' (e.g., an exit sign) or a computer monitor display light 14" (e.g., an LCD backlight or LED array), presenting data to an attending physician.

The surgical suite 10 may further hold a desktop fluorescence microscope 18 for use contemporaneously with surgery to analyze ex vitro tissue from the patient 16 or a surgical fluorescence surgical imaging system 20, for example, suspended for direct viewing of tissue of the patient in vivo, or at the tip of an endoscope which may provide for microscopic or macroscopic imaging as will be described.

Each of these sources of ambient light (12 and 14) may intercommunicate as indicated by logical communication channel 22 with a controller 19 to switch rapidly between an on-state 24 in which light is output and an off-state 26 in which no light is output indicated schematically by an ambient illumination signal 27. The logical communication channel 22 will be discussed below and may take a variety of forms not limited to, for example, a wired network.

The ambient illumination signal 27 has a frequency, intensity, and on-state duration so that the output light flashes at a rate substantially above a flicker fusion rate at which the human eye perceives a flashing. The flicker fusion rate is dependent on illumination brightness and other factors but in the present invention will typically be in excess of 24 Hz and preferably above 300 Hz. Generally the intensity of light during the on-state 24 will be such that an average intensity, that is, the intensity of the on-state 24 times the duty cycle of the on-state 24, provides a desired perceived level of illumination comparable to standard illumination levels. Duty cycle refers to the on-state 24 duration divided by the time between successive on-states 24.

Each of the sources of ambient light (12 and 14) may employ a light source that provides substantially white light and which may be rapidly switched between full and no illumination with minimal warm-up time or afterglow to have a rise and fall time constant that is preferably more than five times faster than the frequency of the illumination signal 27. Standard light emitting diodes (LEDs) may be used for this purpose, which employ an ultraviolet LED emitter exciting a phosphor or similar material if the phosphor has a short fluorescence lifetime on the order of tens of microseconds. Alternatively, the light emitting diodes may employ a combination of red, green, and blue (and optionally orange) light emitting diodes and no phosphor to simulate white light with no phosphor afterglow.

Referring still to FIG. 1, the surgical imaging system 20 may provide for an exciting light source 25, for example, a laser having a frequency appropriate to excite fluorescence in fluorescent marker compounds 28 in tissue of the patient 16. In one nonlimiting example, the exciting light source 25 may provide near infrared light suitable for stimulating indocyanine dyes. The exciting light source 25 may also communicate as indicated by logical communication channel 22 with the controller 19 to switch rapidly between an on-state 24 in which light is output and an off-state 26 in which no light is output indicated schematically by an exciting illumination signal 29. Importantly, the on-state 24 of the exciting illumination signal 29 is coordinated to align with the off-state 26 of the ambient illumination signal 27 so as to allow fluorescent imaging with reduced interference from the ambient lighting while reducing exhaustion of the fluorescent material.

Figure 2:
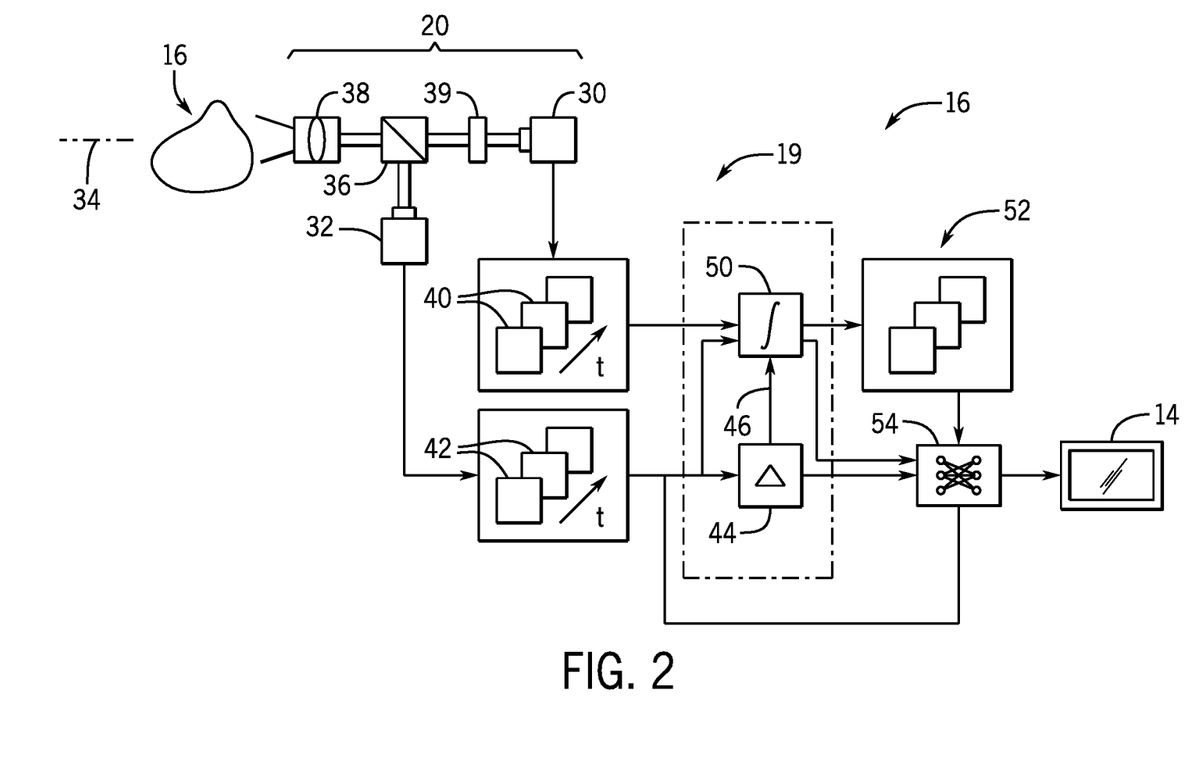
FIG. 2 is a functional block diagram of the control system of FIG. 1 receiving a sequence of low-light images and a high-light images from co-registered cameras, and using the high-light images to deduce motion (optical flow) by means of a motion extractor which is then used to control the combination of successive low-light images by an integrator for improved signal-to-noise ratio and further showing a trained neural network receiving the integrated images to produce a reduced artifact output image.

Referring now to FIG. 2, the surgical imaging system 20 may provide a first low-light camera 30 and second high-light camera 32 co-registered with the low-light camera 30 to image tissue of the patient 16 along a common imaging axis 34. This co-registration may be obtained, for example, by means of a beam splitter 36 dividing the light from the tissue of the patient 16 between the low-light camera 30 and high-light camera 32, which may share a common lens system 38. Alternatively, the cameras may have roughly aligned but independent optical paths and the registration may be done digitally by an electronic computer. In some contemplated embodiments, a single camera can capture both the low-light and high-light images with either a mechanically switched filter or a bayer pattern filter array over the pixels.

The low-light camera 30 will be used to acquire fluorescence imaging data and in that respect may have a blocking filter 39 providing a filter passing light in the desired wavelength range of the florescent signal from the tissue of the patient 16. In one embodiment, the filter may be adapted to pass near-infrared light, for example, from a from fluorescent agent such as indocyanine green (ICG).

The low-light camera 30 is desirably a single photon type camera such as a single photon avalanche diode array (SPAD) or Quanta Image Sensor (QIS) providing a high time resolution (less than 100 ps) and sensitivity down to individual photons. The low-light camera 30 may have a low resolution, for example, less than 1000 pixels, or no more than 32×32 pixels, although the inventors contemplate that higher resolutions may be useful as such systems become available, including 1024×500 pixel arrays.

The high-light 32 camera 30 may be a standard CMOS camera providing color imaging and a spatial resolution of greater than the low-light camera 30, for example, having a resolution higher than the low-light camera 30, for example, in excess of 1 million pixels, for example, providing at least 1920×1080 pixels.

Each of cameras 30 and 32 will produce a respective set of low-light frames 40 and high-light frames 42, for example, at a frame rate dictated by a fraction of the frequency of the signals 27 and 29 and typically at a rate above the flicker fusion rate of about 40-60 frames per second.

The high-light frames 42 are provided to the controller 19 which implements a motion extractor determining motion of the tissue of the patient 16 being imaged from successive frames to produce an optical flow signal 46. This optical flow signal 46 provides a set of vectors for each pixel of the frames 42 indicating the relative motion direction and distance for that pixel with respect to the previous frame 42. In a nonlimiting example, the motion extraction can be performed using the Gunnar-Farneback optical flow algorithm described in Farneback G. (2003) "Two-Frame Motion Estimation Based on Polynomial Expansion," in: Bigun J., Gustavsson T. (eds) Image Analysis, SCIA 2003, Lecture Notes in Computer Science, vol 2749, Springer, Berlin, Heidelberg.

The optical flow signal 46, the high-light frames 42, and the low-light frames 40 are then provided to an integrator 50 which uses the optical flow signal to align successive low-light frames 40 for an integration process that sums the images on a pixel-by-pixel basis to improve the signal-to-noise ratio as will be discussed below. The result is a set of optical flow denoised frames 52.

The denoised frames 52 and the high-light frames 42 are then provided to a trained neural network 54 to remove artifacts caused by the warping of the images by the integrator 50 used to correct for optical flow. The neural network 54 per its training (which will be described in more detail below) may also perform denoising of the images and may augment the information of the low-light frames 40 (via the denoised frames 52) with the information contained in the high-light frames 42.

The output of the neural network 54 provides reduced noise low-late image frames which may be output to display 14, for example, for use during surgery or may be used in any subsequent process requiring information from fluorescent imaging or the like.

Figure 3:
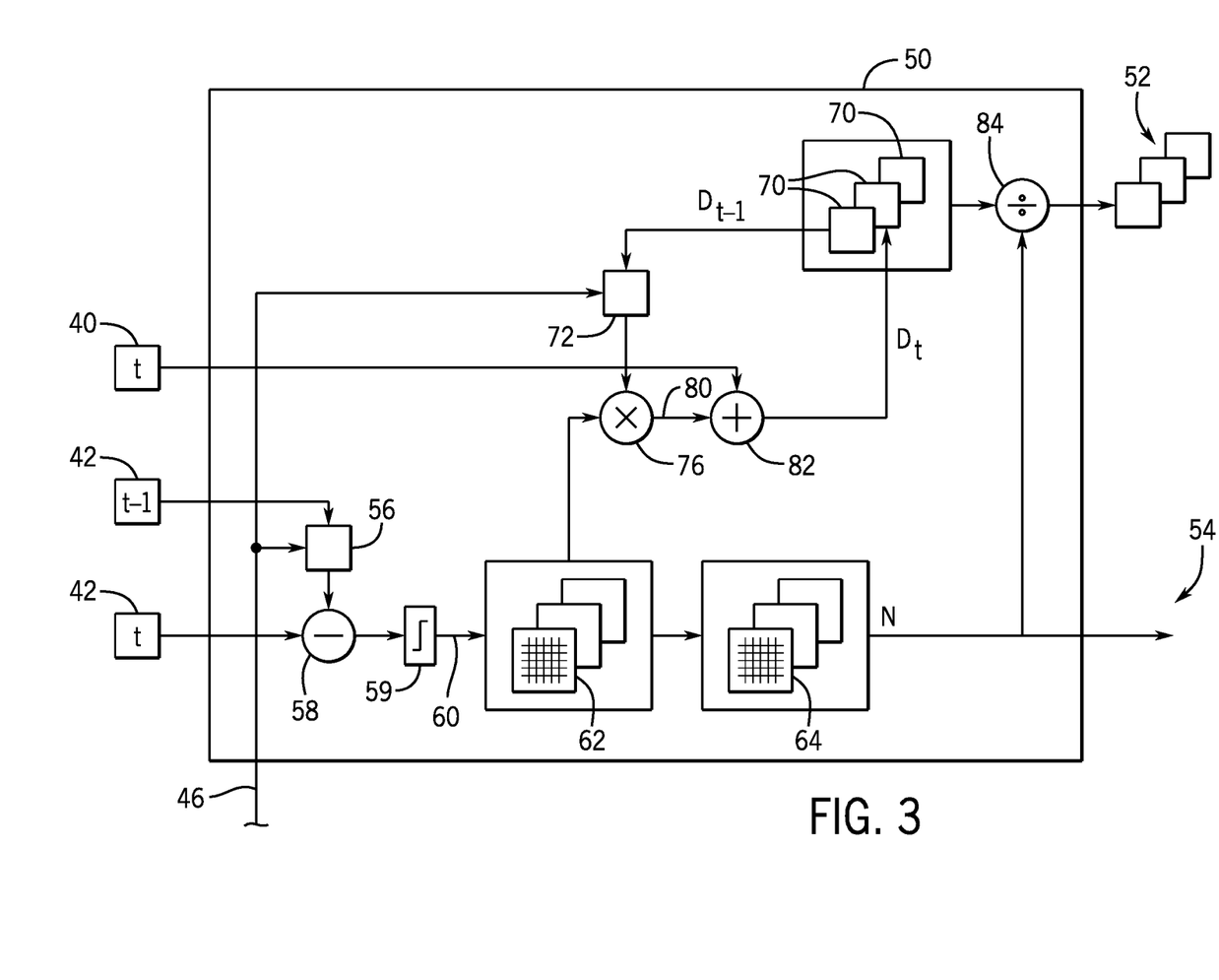
FIG. 3 is a detailed block diagram of the integrator of FIG. 2 combining successive low-light images as guided by the extracted optical flow and an optical flow failure map.

Referring now to FIG. 3, the integrator 50 will receive successive high-light frames 42, for example, at times t-1 and t, and use the optical flow signal 46 to warp the image from t-1 as indicated by warping block 56 according to the optical flow signal 46 obtained between times t-1 and t. This warped high-light frame of t-1 is then compared to the high-light frame 42 at t to compute a pixel-by-pixel difference between these frames at process block 58. These difference values are applied to a thresholder 59 comparing each difference value to a predetermined threshold defining a point at which the pixel difference likely indicates a motion detection error. The outputs of the thresholder 59 provide a binary mask value 60 for each pixel of a frame 42 to create an optical flow failure map 62 for time t. Successive optical flow failure maps 62 are generated for each successive frame 42.

It will be appreciated that if the warping process of warping block 56 perfectly corrects for motion between times t-1 and t of the high-light frames 42 then the optical flow failure map 62 will have values of zero for all pixels. On the other hand, differences between successive frames 42 after warping of the earlier frame for motion, for example, because one image may be occluded by a surgical instrument or the like, will produce values of one in the optical flow failure map 62 for the pixels in that region of occlusion. More generally the optical flow failure map 62 will reflect any significant difference between the warped and current image not limited to occlusion.

The optical flow failure map 62 is used to reset a set of averaging counters 64 that provide a running total of the number of successive frames in which a given pixel has not been subject to an optical flow failure. Use of the averaging counters 64 will be described later. Like the optical flow failure map 62, the averaging counters 64 provide a count value for each pixel of a frame 42, and snapshots of the averaging counters 64 may be stored for each frame time.

The optical flow signal 46 is also used to warp a current denoised frame 70 which represents a running integration of motion-corrected low-light frames 40 as will now be described. In this process, a current denoised frame for time t-1 is received by warping block 72 also receiving the optical flow signal 46 to warp the current denoised frame for time t-1 to the current time t. This warped frame 74 is then multiplied by the optical flow failure map 62 at multiplier 76 so that the warped frame 74 only includes valid pixels (with invalid pixels zeroed). The resulting masked signal 80 is then summed with the current low-light frame 40 at summing block 82, and this used to provide the next denoised frame 70 for time t.

Each denoised frame 70 as it is computed is then normalized by divider 84 on a pixel-by-pixel basis by dividing the value of each pixel by the averaging counters 64 for that pixel. This division process compensates for the fact that the pixel values will represent integrations over different durations according to the last occurrence of an optical flow failure.

The output of the divider 84 then provides the denoised frames 52 which are input to the neural network shown in FIG. 2. In one embodiment, the neural network 54 receives five consecutive denoised frames 52 together with the corresponding values of the averaging counters 64 and highlight frames 42.

Figure 4:
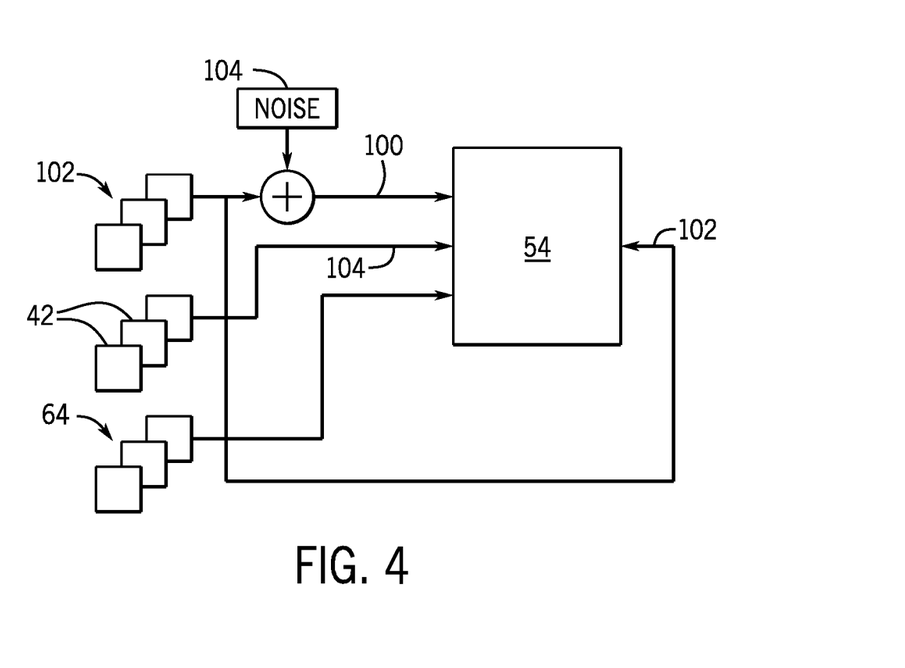
FIG. 4 is a block diagram of a training system for the neural network of FIG. 2.

Referring now to FIG. 4, the neural network 54 may in one embodiment provide an architecture following the teachings of FastDVNet as described in Matias Tassano, Julie Delon, and Thomas Veit: DVDNet: A fast network for deep video denoising, in 2019 IEEE International Conference on Image Processing (ICIP), pages 1805-1809, 2019.

Training of the neural network 54 is performed with a set of noisy fluorescent frames 100 in pairs with corresponding ground truth fluorescent frames 102. Both frames of each pair may be derived from tissue samples injected with indocyanine green, for example, into the femoral artery of a chicken thigh manipulated over many frames to simulate vascular surgery. Imaging of this vascularized tissue and injected dye provide high visual contrast, low-noise images that can be used as the ground truth fluorescent frames 102. The noisy fluorescent frames 100 are then prepared by reducing the signal strength and introducing noise 104 of a type expected for the particular detector (random additive Poisson noise for a SPAD detector) and other types of noise such as spatial distortion expected from the warping process of the present invention, blurring from a combination of successive frames and quantization noise. The training set may also include a high-resolution image 104 obtained contemporaneously with a camera similar to high-light camera 32 and registered with the frame 102. Finally, the values of the averaging counters 64 for each pixel may be provided.

The training process cycles through these training set values to train the weights of the neural network 54 and may use a mean square error loss function in the training process and optimization using the ADAM Optimizer described in Diederik P. Kingma and Jimmy Ba: Adam: A method for stochastic optimization, in Yoshua Bengio and Yann LeCun, editors, 3rd International Conference on Learning Representations, ICLR 2015, San Diego, CA, USA, May 7-9, 2015, Conference Track Proceedings, 2015.

While the invention has been described in a medical context for imaging tissue, it will be appreciated that the same principles can be applied to nonmedical applications including for example LiDAR systems, thermal imaging, polarimetry, hyperspectral imaging, images of material scattering, non-line of sight imaging, and others, where there are different received illumination signals with substantially different flux, so that the stronger signal can allow motion tracking to permit integration of the weaker signal to improve its signal-to-noise ratio.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

The term "frame" as used herein is intended to describe an array of at least two dimensions of pixels taken at a given time interval and includes frames where each pixel is a single intensity value or a histogram of fluorescence lifetimes.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller", "a processor", or "a computer" can be understood to include one or more circuits that can communicate in a stand-alone and/or a distributed environment(s), and can thus be configured to communicate via wired or wireless communications with other circuits. Generally, such a device may be dedicated circuitry such as constructed from discrete components, an FPGA or ASIC or the like, or may provide a standard computer architecture including one or more processors such as a CPU, GPU, and/or one or more purpose-built accelerators and computer memory holding a data and a stored program. Such devices may be associated with or include standard input and output devices including a graphic display terminal, a keyboard, a voice interface, a touchscreen, a trackball, or mouse or the like and may provide for input/output connections through standard electronic interfaces, level shifting circuits, and analog-to-digital and digital-to-analog converters and/or digital interfaces employing standard protocols for electrical communication. In particular, the present invention may provide for software and circuitry to interface with the above devices and other devices including for example other medical systems according to protocols required for DICOM®, as well as to remote devices using the Internet, various wireless and wired communications including IEEE 802.11, as well as various video and audio interfaces of types well known in the art.

The memory may store one or more types of instructions and/or data including those to implement the invention as described above, and to permit operation of the interfaces described above, and may include volatile and/or non-volatile non-transitory computer readable media, for example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory can be a component of a processor, can be operatively connected to a processor for use thereby, or a combination of both.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

We claim:

1. A low-light video system comprising:
   at least one camera adapted to:
   receive low light from an imaged object to provide a sequence of low-light image frames;
   receive high light from the imaged object having a greater flux than the low light to provide a sequence of high-light image frames;
   an electronic processor implementing:
   (a) a motion extractor receiving the high-light image frames from the at least one camera to determine motion of the imaged object between high-light image frames; and
   (b) an integrator combining low-light image frames after alignment according to the motion determined by the motion extractor to output reduced noise low-light image frames; and
   further including a neural network receiving the reduced noise low-light image frames and outputting corrected low-light image frames, the neural network trained with a teaching set of pairs of low-light image frames with respectively higher and lower levels of noise with respect to a common imaged object.

2. The low-light video system of claim 1 wherein the higher and lower levels of noise are differences selected from the group consisting of random additive noise, spatial distortion, blurring, and quantization noise.

3. The low-light video system of claim 1 wherein the teaching set of low-light image frames are of tissue.

4. The low-light video system of claim 3 wherein each teaching set pair of low-light image frames include a fluorescence image of tissue and the same fluorescence image of tissue with added simulated noise.

5. The low-light video system of claim 3 wherein the teaching set of low-light image frames represents images taken with the at least one camera of the tissue and wherein the teaching set further includes high-light image frames representing images taken with the at least one camera of the tissue and where the neural network further receives the high-light image data.

6. The low-light video system of claim 1 further including an error detector producing an error signal indicating errors in the determined motion relating to at least a portion of a high-light image frame and wherein the integrator uses the error signal to exclude a portion of a corresponding low-light image frame from the combining.

7. The low-light video system of claim 6 wherein the error signal is produced by warping an early received high-light image frame according to the motion with respect to a later received-light image frame and comparing the warped early received high-light image frame to the later received high-light image frame to identify pixels having differences in value of more than a predefined threshold, the determined pixels providing the error signal.

8. The low-light video system of claim 1 wherein the integrator combines different numbers of low-light image frames for different pixels of the low-light image frames.

9. The low-light video system of claim 1 further including an error detector producing an error signal indicating errors in the determined motion and wherein the integrator combines different numbers of low-light image frames for different given pixels of the low-light image frames according to a number of low-light image frames occurring after an error signal including the given pixel.

10. The low-light video system of claim 1 further including a synchronization circuit synchronizing an acquisition of the sequence of low-light image frames and sequence of high-light image frames with an area illuminator switching between an on-state and off-state so that the low-light image frames are obtained only during the on-state and high-light image frames are obtained only during the off-state.

11. The low-light video system of claim 1 wherein the at least one camera includes a filter selectively passing infrared light and blocking visible light.

12. The low-light video system of claim 1 wherein the low-light image frame have a lower image resolution than the high-light image frames.

13. The low-light video system of claim 1 wherein the at least one camera is a single photon camera.

14. A method of low-light imaging using a system including:
   at least one camera adapted to:
   receive low light from an imaged object to provide a sequence of low-light image frames;
   receive high light from the imaged object having a greater flux than the low light to provide a sequence of high-light image frames; and
   an electronic processor implementing:
   a motion extractor receiving the high-light image frames from the at least one camera to determine motion of the imaged object between high-light image frames;
   an integrator combining low-light image frames after alignment according to the motion determined by the motion extractor to output an image based on combined low-light image frames, and
   a neural network receiving the reduced noise low-light image frames and outputting corrected low-light image frames, the neural network trained with a teaching set of pairs of low-light image frames with respectively higher and lower levels of noise with respect to a common imaged object;
   the method comprising:
   (a) obtaining a sequence of low-light image frames and a corresponding sequence of high-light image frames of an object subject to motion;
   (b) using the high-light image frames to deduce motion of the subject; and
   (c) combining the low-light image frames after alignment according to the motion deduced from the high-light image frames; and
   (d) processing the reduced noise low-light image frames using the neural network and outputting corrected low-light image frames.

15. A low-light video system comprising:
   at least one camera adapted to:
   receive low light from an imaged object to provide a sequence of low-light image frames;
   receive high light from the imaged object having a greater flux than the low light to provide a sequence of high-light image frames; and a neural network receiving data from the low-light image frames and the high-light image frames to output an image based on a combination of the data of the low-light image frames and the high-light image frames, the neural network trained with a teaching set of pairs of low-light image frames with respectively higher and lower levels of noise with respect to a common imaged object.

16. The low-light video system of claim 15 wherein the higher and lower levels of noise are differences selected from the group consisting of random additive noise, spatial distortion, blurring, and quantization noise.

17. The low-light video system of claim 15 wherein the teaching set of low-light image frames are of tissue.

18. The low-light video system of claim 17 wherein each teaching set pair of low-light image frames includes a fluorescence image of tissue and the same fluorescence image of tissue with added simulated noise.

19. The low-light video system of claim 17 wherein the teaching set of low-light image frames represents images taken with the at least one camera of the tissue and wherein the teaching set further includes high-light image frames representing images taken with the at least one camera of the tissue.

20. The low-light video system of claim 15 wherein the low-light image frame have a lower image resolution than the high-light image frames.

21. The low-light video system of claim 15 wherein the at least one camera is a single photon camera.

* * * * *